Patented Feb. 7, 1933

1,896,725

UNITED STATES PATENT OFFICE

WELLINGTON L. TANNER, OF PANASOFFKEE, FLORIDA, ASSIGNOR TO NATIONAL CHEMICAL AND MFG. CO., INC., A CORPORATION OF ILLINOIS

PRODUCTION OF CELLULOSE PHOSPHATES

No Drawing. Application filed June 12, 1931. Serial No. 544,041.

The present invention relates to improvements in the production of cellulose phosphates, and will be fully understood from the following description thereof.

In preparing cellulose phosphate esters in accordance with the present invention, I employ cotton or other suitable source of cellulose, such as is commonly employed, for example, in the production of nitrocellulose, cellulose acetate, viscose or the like. Thus, properly purified wood pulp or cellulose fiber from various vegetable sources may be employed.

In carrying out the present invention, the cellulose is reacted upon with phosphoric acid in the presence of strong sulfuric acid and of a small proportion of a weak acid, such as acetic acid, boric acid or the like. By varying the relative proportions of the phosphoric acid employed, the degree of esterification may be correspondingly varied. Thus I have secured products in which the combined phosphorus ranges from 10% to 40%.

In carrying out the reaction I prefer to employ ortho-phosphoric acid, although pyro-phosphoric acid or meta-phosphoric acid may likewise be employed. Although small amounts of water may be present in the reaction mixture, I prefer that it be substantially anhydrous. Thus, although concentrated sulfuric acid may be employed in conducting the reaction, I prefer to use a sulfuric acid of 100% strength.

In carrying out the reaction, low temperatures, preferably below 15° C. are employed. In general, the temperature at the beginning of the reaction is held at from zero degrees to 10° C., say about 5° C. The period of reaction is short, being in general from about 1 to about 5 minutes and immediately upon completion of reaction, the entire reaction mixture is discharged into cold water, which may or may not contain a small amount of a neutralizing agent.

The following example illustrates the present invention:

Cotton or cotton linters or other suitable cellulose material, preferably cleaned and washed, is dried and comminuted to a small size, preferably so that it will all pass through a twenty mesh screen. Five parts by weight of the cotton or cellulose material is then quickly introduced into a reagent mixture of the following composition:

| | Parts |
|---|---|
| Sulfuric acid (100%) | 30 |
| Ortho-phosphoric acid | 20 |
| Glacial acetic acid | 1 |

The reagent mixture, before introduction of the cotton, is cooled to a suitable temperature, preferably below 15° C., say to 5° C. The cotton is thoroughly intermixed with the phosphoric acid mixture. Reaction is completed in about two minutes and the entire mass is then discharged into 1000 parts of pure water, which is preferably preliminarily cooled, say to 10 to 12° C., and the mixture thoroughly agitated. The cellulose ester is filtered out and washed with water until the wash water is practically free from acidity. If desired, a small proportion of a suitable alkali, such as sodium hydroxide, sodium carbonate or the like may be contained in the water into which the acid reaction mixture is discharged or in the wash water to more rapidly remove the acid present. The product resulting from the above process contains about 17% phosphorus and corresponds in formula substantially to cellulose triphosphate $(C_6H_7O_2(PO_4)_3)$.

By varying the proportions of the phosphoric acid in the reagent mixture, the proportion of phosphorus in the cellulose ester and the degree of esterification may be correspondingly varied. Thus I have secured esterified products in which the combined phosphorus ranges from 10% to 40%, such as the triphosphate, the tetraphosphate, the pentaphosphate, the hexaphosphate and mixtures thereof with higher and lower esters.

The proportion of sulfuric acid in the reaction mixture may be widely varied, say from one-half to three-fourths of the total acid present. In place of glacial acetic acid, other mild acid catalysts may be employed, such as boric acid, formic acid and the like.

The cellulose phosphate esters prepared in accordance with the present invention, may be employed in the production of lacquers, plastics and the like in the same manner as the nitrocelluloses, acetal celluloses and the like and are particularly advantageous, for example, in the production of films, lacquers and the like, by reason of their substantial non-inflammability or very low inflammability.

I claim:

1. The method of producing cellulose phosphate esters which comprises reacting upon cellulose with an acid mixture containing concentrated sulfuric acid, a phosphoric acid and a relatively small quantity of a weak acid catalyst.

2. The method of producing cellulose phosphate esters which comprises reacting upon cellulose with an acid reagent mixture containing concentrated sulfuric acid, ortho-phosphoric acid and a relatively small quantity of weak acid catalyst.

3. The method of producing cellulose phosphate esters which comprises reacting upon cellulose with an acid reagent mixture containing ortho-phosphoric acid, sulfuric acid and a small proportion of an anhydrous weak acid, said reagent mixture containing sulfuric acid in proportions ranging from one-half to three-fourths the entire mixture.

4. The method of producing a cellulose phosphate ester which comprises forming a substantially anhydrous reagent mixture containing sulfuric acid, phosphoric acid and a weak acid catalyst, cooling said reagent mixture, and introducing cellulose thereinto.

5. The method of producing a cellulose phosphate ester which comprises forming a substantially anhydrous reagent mixture containing sulfuric acid, phosphoric acid and a weak acid catalyst, cooling said reagent mixture to about 5° C. and introducing cellulose thereinto.

6. The method of producing a cellulose phosphate ester which comprises forming a substantially anhydrous reagent mixture containing sulfuric acid, phosphoric acid and a weak acid catalyst, cooling said reagent mixture to about 5° C. and introducing cellulose thereinto, and adjusting the proportions of phosphoric acid and cellulose to secure the desired phosphate ester.

7. The method of producing a cellulose phosphate ester which comprises forming a substantially anhydrous reagent mixture containing sulfuric acid, phosphoric acid and a weak acid catalyst, cooling said reagent mixture to about 5° C. and introducing cellulose thereinto, and discharging the mixture on completion of reaction into a body of cold water.

WELLINGTON L. TANNER.